April 4, 1944.  T. D. GREEN  2,345,808
COOLING NOZZLE FOR HOLLOW GLASSWARE
Filed June 5, 1942
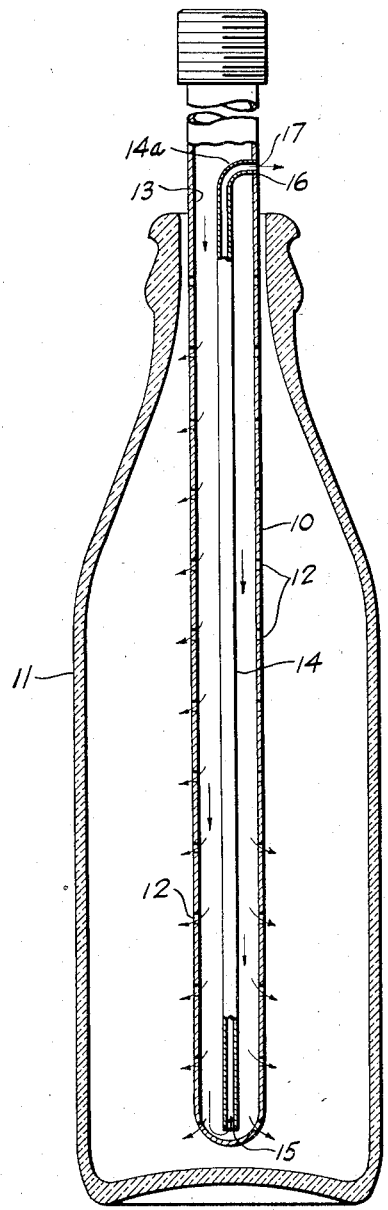
Inventor
Thomas D. Green.
by Brown & Parham
Attorneys Patented Apr. 4, 1944

2,345,808

UNITED STATES PATENT OFFICE 2,345,808

COOLING NOZZLE FOR HOLLOW GLASSWARE

Thomas D. Green, West Hartford, Conn., assignor to Hartford-Empire Company, Hartford, Conn., a corporation of Delaware Application June 5, 1942, Serial No. 445,912

4 Claims. (Cl. 49—45)

This invention relates to improvements in nozzles suitable for use to effect cooling of the internal surface of an article of hollow glassware, such as a bottle or jar, as in tempering.

It has been proposed to effect the desired cooling of the internal surface of a bottle, jar or other article of hollow glassware for tempering by discharging a mist of gaseous fluid and liquid spray from a nozzle within the glass article. Attempts to carry such a proposal into effect have however met with the difficulty that the desired condition of finely divided minute particles of liquid uniformly commingled with the air or other gaseous fluid may not be maintained during the passage of the cooling fluid through the nozzle even if that fluid had that condition when it entered the nozzle.

Much of the liquid component of the mist supplied to the interior of the nozzle may gather on the inner wall of the nozzle as a downwardly moving liquid film thereon. While some of the liquid film may be re-atomized at the jet holes in the wall of the nozzle, part of it may continue to the bottom of the internal space within the nozzle and produce an undesired accumulation of liquid at that place. Also, some of the liquid particles of the mist or atomized mixture supplied to the nozzle may combine with each other to form drops or accumulations of liquid on the inner wall of the nozzle and these may be enlarged by the combination therewith of other particles until they fall or are blown downwardly to the bottom part of the nozzle. The cooling operation, especially if tempering of a bottle or other hollow glass article is being attempted, is likely to be impaired or rendered unsatisfactory by the accumulation of a solid body of the liquid within the bottom part of the nozzle. Some of this liquid may be squirted through one or more of the jet holes onto the inner wall of the article and may effect locally intensified chilling of that portion of the wall to an undesirable extent and in fact to such an extent as to cause checking or even fracture thereof at that place.

An object of the present invention is to prevent the accumulation of liquid from a gaseous fluid-liquid spray coolant in the bottom part of the interior of a nozzle that is being used to apply such coolant to the interior of a hollow glass article.

Another object of the invention is to remove from the interior of the nozzle excess liquid that might interfere with the desired cooling of the internal surface of a hollow glass article by a gaseous fluid-liquid spray coolant applied thereto by such nozzle.

The invention may be carried into effect by providing a suitable fluid eductor within the cooling nozzle. The intake end of this eductor may be located adjacent to the bottom of the space within the nozzle and the outlet of the eductor may communicate with the atmosphere outside of the glass article that is being cooled internally by use of the nozzle.

Other objects and advantages of the invention will be hereinafter pointed out or will become apparent from the following description of a practical embodiment of the invention as shown in the accompanying drawing, in which:

The view is a longitudinal vertical section of a nozzle provided with an eductor according to the invention and in position to effect cooling of the internal surface of a glass bottle.

The drawing shows a tubular nozzle body 10 closed at its lower end and of suitable diameter and length to project downwardly from a level above an upright bottle 11 through the open mouth or upper end of the bottle nearly but not quite to the bottom of the bottle in spaced concentric relation therewith. Fluid coolant may pass from the longitudinally extending internal space 13 within such nozzle body through the jet holes to the interior of the bottle 11 to cool the internal surface thereof.

The jet holes may be formed so as to be particularly adapted for the use of a gaseous fluid-liquid spray coolant as disclosed and claimed in my copending application, Ser. No. 445,910, filed June 5, 1942. In the example shown, these jet holes are arranged in a single vertical series extending longitudinally of the nozzle body, but it is to be understood that such jet holes may be arranged in both longitudinally extending and circumferentially extending series and that the number, size or sizes and relative arrangement of the jet holes may vary with the nozzle body as deemed best in view of the service to be performed by a particular nozzle. Preferably, some means, not shown, will be provided to effect relative rotation about its vertical axis between the nozzle and the glass article to be cooled by the use of such nozzle.

The nozzle and the glass article to be cooled may be supported in cooperative relation with each other by any suitable supporting and operating mechanism, none shown, so that the jets of fluid coolant issuing from the jet holes of the portion of the nozzle body within the glass article will effect cooling of the internal surface of the glass article, as for tempering thereof. In its operative position, the closed lower end of the nozzle body may be spaced above but be adjacent to the bottom of the glass article, substantially as shown.

The means shown in the drawing for evacuating part of the gaseous fluid and entrained excess liquid from the lower part of the space within the nozzle body comprises an eductor or fluid escape tube 14 having an intake opening 15 at its lower end in open communication with the space within the nozzle body at a level adjacent to the bottom thereof. As shown, the tube 14 has its upper end portion bent or curved laterally at 14a and secured, as by brazing, in an opening 16 in the wall of a portion of the nozzle body that projects above the upper end of the glass article 11. The tube 14 is shown as being open at 17 at its upper end so as to communicate with the atmosphere at a place above the level of the upper end of the glass article 11. By this structural arrangement, the tube 14, which is much smaller in diameter than the nozzle body, is supported in an approximately centered position in the portion of the nozzle body that projects into the article to be cooled. Obviously, various mechanical arrangements or expedients may be employed to support the eductor tube 14 within the nozzle body so that the open intake end of the tube will be located adjacent to the bottom of the space within the nozzle body and the upper end of such tube will be suitably located to discharge the contents of the eductor tube into the atmosphere or elsewhere outside of the glass article being cooled.

The operation of the illustrative embodiment of the invention will be readily understood. An atomized mixture of air, or other gaseous fluid, and of water, or other suitable liquid, may be supplied to the interior of the nozzle body by any suitable means when the nozzle is in operative position within the glass article, as shown. Some of the gaseous fluid of this coolant as supplied to the interior of the nozzle will be drawn off by the eductor tube 14 and will carry with it any excess accumulation of liquid that otherwise would accumulate in the lower part of the nozzle. If considered desirable or necessary, a suitable source of suction or sub-atmospheric pressure may be operatively connected with the outlet end of the eductor tube 14.

Various modifications of the structure shown and herein described will readily occur to those skilled in the art.

I claim:

1. A cooling nozzle suitable for use in tempering articles of hollow glassware, said nozzle comprising an elongate hollow body closed at its free end and provided with jet holes in the wall thereof, and an eductor tube extending within said hollow body of the nozzle and having an intake opening located in direct communication with the space within the closed free end portion of the nozzle body and an outlet to the exterior of the nozzle body.

2. A cooling nozzle of the character described comprising an elongate hollow body closed at its free end and provided with jet holes in the wall thereof, and a fluid escape tube extending within the hollow body of the nozzle longitudinally thereof, said fluid escape tube having an open intake end and located within the free end portion of the nozzle and an outlet to the atmosphere at a substantial distance rearwardly along the nozzle body from the location of said intake end.

3. A cooling nozzle of the character described comprising an elongate hollow body closed at its free end and adapted to be disposed in a vertical position so as to depend into an upright hollow glass article that is to be cooled, said hollow body having jet holes in the wall of the portion thereof within the glass article for discharging a fluid coolant having gaseous and liquid components into the interior of said glass article, and means for defining an elongate fluid-conducting passage in direct communication at one end with the lower part of the space within the hollow nozzle body and in communication at its opposite end with the atmosphere at a level above that of the upper end of the glass article to carry off any excess liquid component of the coolant from the interior of said nozzle body.

4. A cooling nozzle of the character described comprising an elongate hollow body closed at its free end and adapted to be disposed in a vertical position so as to depend into an upright hollow glass article that is to be cooled, said hollow body having jet holes in the wall of the portion thereof within the glass article for discharging a fluid coolant having gaseous and liquid components into the interior of said glass article, and an eductor tube extending vertically within said hollow body from a level above that of the upper end of said glass article to a level adjacent to the bottom of the space within the hollow body, said eductor tube being open at its lower end for communication with the space within the nozzle body and being constructed and arranged to communicate at its upper end with the atmosphere.

THOMAS D. GREEN.

CERTIFICATE OF CORRECTION.

Patent No. 2,345,808.  April 4, 1944.

THOMAS D. GREEN.

It is hereby certified that error appears in the printed specification of the above numbered patent requiring correction as follows: Page 2, second column, line 16, claim 2, for "and" read --end--; and that the said Letters Patent should be read with this correction therein that the same may conform to the record of the case in the Patent Office.

Signed and sealed this 16th day of May, A. D. 1944.

(Seal)

Leslie Frazer
Acting Commissioner of Patents.